United States Patent [19]

Hegedus et al.

[11] Patent Number: 5,403,880
[45] Date of Patent: * Apr. 4, 1995

[54] POLYURETHANE SELF-PRIMING TOPCOATS

[75] Inventors: Charles R. Hegedus, Coopersburg, Pa.; Donald J. Hirst, Mt. Laurel; Anthony T. Eng, Cherry Hill, both of N.J.

[73] Assignee: The United States of America as represented by the Secretary of the Navy, Washington, D.C.

[ * ] Notice: The portion of the term of this patent subsequent to Aug. 17, 2010 has been disclaimed.

[21] Appl. No.: 207,445

[22] Filed: Mar. 7, 1994

Related U.S. Application Data

[63] Continuation-in-part of Ser. No. 62,864, May 14, 1993, Pat. No. 5,308,903.

[51] Int. Cl.$^6$ .............................................. C08L 75/04
[52] U.S. Cl. ...................... 524/204; 524/210; 524/222; 524/396; 524/414; 524/507; 524/706; 524/724; 524/783; 427/385.5; 427/388.1; 427/388.5; 427/407.1
[58] Field of Search .............. 524/204, 210, 222, 396, 524/414, 507, 706, 724, 783; 427/385.5, 388.1, 388.5, 407.1

[56] References Cited

U.S. PATENT DOCUMENTS 5,236,983  8/1993  Hegedus et al. ...................... 524/204
5,274,021  12/1993  Geeck et al. ......................... 524/417

*Primary Examiner*—John Kight, III
*Assistant Examiner*—Duc Truong
*Attorney, Agent, or Firm*—James V. Tura; Susan E. Verona

[57] ABSTRACT

A corrosion-resistant polyurethane coating for application directly to a surface as a self-priming topcoat comprising major amount of a polyurethane binder and minor amount of a combination of pigments consisting essentially of an aluminum phosphate, zinc salts of benzoic acids, and an alkaline earth metal phosphate such as zinc-barium phosphate. In addition, the coating contains up to about 30 parts by weight of a titanium dioxide pigment, up to about 2.0 parts by weight of an oil soluble surface active agent and up to about 50 parts by weight of at least one organic solvent.

12 Claims, No Drawings

POLYURETHANE SELF-PRIMING TOPCOATS

STATEMENT OF GOVERNMENT INTEREST

The invention described herein may be manufactured and used by or for the Government of the United States of America for governmental purposes without the payment of any royalties thereon or therefor.

CONTINUATION APPLICATIONS

This application is a continuation-in-part of application Ser. No. 08/062,864, filed May 14, 1993, now U.S. Pat. No. 5,308,903.

BACKGROUND OF THE INVENTION

This invention relates to novel coating compositions and more specifically to corrosion-resisting coatings which can be applied directly to various surfaces particularly metal either as a high or low gloss, self-priming topcoat.

Various surfaces and particularly metal surfaces require the protection of coatings especially when the surfaces are exposed to a corrosive environment. Metal surfaces of aircraft, for example, are exposed to seawater which require protection from corrosion. Specifically, aircraft, e.g., Navy aircraft, are exposed to seawater spray in addition to various acid-forming gases such as sulfur dioxide, carbon dioxide, etc. Moreover, in addition to aircraft, various machinery and equipment in the industrial environments, where fossil fuels are used need protection against corrosion. It is important therefore that the coating be resistant to corrosion, various chemicals, the weather and at the same time be flexible and have good adhesion to the substrates.

Presently, coating systems comprise one or more films, i.e., an undercoat, a sealant and a topcoat. Aircraft, for example, traditionally have been coated with high performance two-component protective films consisting of an epoxy primer and a polyurethane topcoat. The type of epoxy primers used on the aircraft are designed to adhere to the metal surface and help to improve the adhesion of the topcoat and together prevent corrosion of the metal. However, these undercoats require a topcoat, since the undercoats lack flexibility especially at low temperatures ($-60°$ F.) resulting in extensive cracking particularly in highly flexed areas of the aircraft. The undercoats usually lack weather resistance and generally cannot be formulated in different colors required for aircraft.

The polyurethane compositions of this invention, however, provides the necessary corrosion resistance, the required degree of flexibility, the desired optical properties, and the needed resistance to weather and various chemicals. To obtain these characteristics, the multi-film coatings used heretofore generally required a dry-film thickness ranging up to about 0.005 inches, e.g., up to about 10 mils or more which added considerable weight to the aircraft. In addition, the multi coats are time consuming to apply particularly since there is a drying time between each application. Further, the removal of a multi-coat system can be difficult and time consuming and generate high levels of volatile organic (VOC) emissions during the operations.

In accordance with this invention, however, the corrosion-resistant coating comprise a polyurethane binder derived from the reaction of at least one polyol and an isocyanate, e.g., hexamethylene diisocyanate (HDI) in combination with a synergistic combination of corrosion-inhibiting pigments consisting essentially (1) of an alkaline earth metal phosphate, e.g., zinc-barium phosphate, (2) zinc salts of benzoic acid or substituted benzoic acid, and (3) an aluminum triphosphate. All three of these pigments are essential, in the stated relative proportions, to provide a single high performance coating with the necessary corrosion resistance and adhesion characteristics required of a good coating. In addition, titanium dioxide ($TiO_2$) including spherical $TiO_2$ particles, e.g., vesiculated beads of $TiO_2$ are included as a pigment together with alkaline earth metal or zinc salts i.e. phosphates and benzoates and the aluminum triphosphate. The coating compositions of this invention may be applied, as one coat, directly onto various hard surfaces such as metal and/or organic matrix composites, etc., and do not require an undercoat to provide a corrosion-resistant finish with desired optical and adhesion properties.

SUMMARY OF THE INVENTION

A corrosion-resistant coating which can be applied directly to a surface as a self-priming topcoat comprising major amounts of a polymeric urethane binder and minor amounts of a unique combination of corrosion-resistant pigments consisting essentially of aluminum triphosphate, zinc salts of benzoic acids, and alkaline earth metal or zinc phosphates such as zinc-barium phosphates, together with surface active agents, $TiO_2$ pigments, and organic solvents.

Accordingly, it is an object of this invention to provide a corrosion-resistant coating which can be applied directly to a surface e.g., metal, as a single coating.

It is another object of this invention to provide a coating which is flexible, resistant to corrosion, chemicals, and weathering, and has good adhesion characteristics.

It is still a further object of this invention to provide a coating for use on military or civilian aircraft of reduced thickness to lower the weight thereon while at the same time providing the necessary corrosion resistance.

These and other objects of the invention are accomplished, in accordance with this invention, by providing a corrosion-resistant coating capable of being applied as a single coating with appropriate optical properties.

THE PREFERRED EMBODIMENTS

This invention is directed to a corrosion-resistant coating which functions as a primer and a topcoat. More specifically, this invention relates to a corrosion-resistant coating which comprises from about 15 to 50 parts, e.g., 20 to 40 parts by weight of the total coating of a urethane resin, i.e., polyurethane resin binders, and a synergistic combination of corrosion-inhibiting pigments, e.g., metal compounds or salts. The unique combination of pigments consist essentially of from about 1 to 30 parts and preferably 5 to 25 parts by weight of an alkaline earth metal phosphate, e.g., zinc or zinc-barium phosphate, 0.1 to 5 parts and preferably 0.5 to 2.0 parts by weight of a zinc salt of a benzoic acid, e.g. a substituted benzoic acid, and about 1 to 25 parts and preferably 5 to 20 parts by weight of an aluminum triphosphate. In addition to the above pigments, depending on the opacity, etc., required of the coating, from 1 to 30 parts, and preferably from 5 to 25 parts by weight of titanium dioxide pigment, based on the total weight of the coating, may be added as an additional pigment. Up to about 100% of the total amount of $TiO_2$ may be in the form of vesiculated beads, e.g., from 0 to 10 of the $TiO_2$ in the coating are in the form of beads. Generally, the coating is applied as a high solids organic solution and therefore comprises from 0 to 2.0 and preferably 0.1 to 0.5 parts by weight of at least one oil soluble surface active agent and from about 0 to 50 parts, e.g. from 15 to 30 parts by weight of the total coating of at least one organic solvent, e.g., Mil-T-81772 or various mixtures of paint solvents.

The organic binder of the coating comprises a polyurethane, and more particularly an aliphatic polyurethane derived from the reaction of a polyol and a multifunctional aliphatic polyisocyanate. The polyol is preferably used as a solution in an organic solvent e.g. toluene, xylene, n-butyl acetate, propylene glycol monomethyl ether acetate, methyl ethyl ketone, etc. The polyisocyanate is used as a 100% solid but also can be diluted with any of the above organic solvents. The hydroxyl number of the polyol, i.e., polyester polyols and the isocyanate (NCO) content or the equivalent weights of the polyisocyanate and polyol are determined in order to obtain the desired polyurethane. The preferred polyols and polyisocyanates are reacted in approximately stoichiometric amounts so that the NCO to OH ratio ranges from about 0.85 to 1.6 equivalent of the NCO to 1.0 equivalent of the OH, or at about a 1.0 to 1.0 ratio of the NCO to OH.

The combination of pigments is unique and consists essentially of specific amounts of an alkaline earth metal phosphate, e.g., zinc phosphate or zinc-barium phosphate etc., zinc salts of benzoic acid or a substituted benzoic acid and an aluminum triphosphate. These three pigments used alone and in combination with $TiO_2$ provide outstanding corrosion protection and enables the coating to be used as a self-priming high-gloss or low-gloss topcoat. The preferred zinc salt of the benzoic acids have at least one hydroxyl-substituent and one ($NO_2$) group. The zinc salt of the benzoic acids are further characterized as having molecular weights of approximately 100 to 500. The preferred zinc phosphates, e.g., zinc-barium phosphate are available as Phos-Plus (J0866) from Mineral Pigments Corporation. In addition to utilizing the above combination of pigments in the required ratios, other known pigments particularly titanium dioxide are added to the coating to provide reinforcing strength and to add color, hiding and opacity to the coating. Other additives that maybe used include tinting pigments or coloring agents which may be added to the coating in small but effective amounts including carbon black, zinc oxide, antimony oxides, barium sulfate, calcium carbonate and one or more of the organic pigments such as the phthalocyanine colors e.g. greens or blues, etc.

The corrosion resistant polyurethane self-priming coatings of this invention can be prepared with the ingredients set forth in examples 1 through 6.

| Ingredients | EXAMPLE 1 Parts by Weight (Ranges) | EXAMPLE 2 Parts by Weight (Ranges) |
|---|---|---|
| Polyurethane Resin derived from polyester polyols and polyisocyanates | 15-50 | 20-40 |
| Titanium dioxide | 1-30 | 5-25 |
| Titanium dioxide vesiculated beads | 0-30 | 0-5 |
| Alkaline earth metal phosphates (zinc and/or barium phosphates) | 1-30 | 5-25 |
| Zinc salts of substituted benzoic acids | 0.1-5 | 0.5-2.0 |
| Aluminum Triphosphate | 1-25 | 5-20 |
| Surface active agents (nonionic or anionic surfactant) | 0-2.0 | 0.1-0.5 |
| Organic solvents for paints | 0-50 | 15-30 |

| | | EXAMPLES 3-6 Parts by Weight | | |
|---|---|---|---|---|
| Ingredient | 3 | 4 | 5 | 6 |
| 1. 79% solids solution polyester polyol in organic solvents (propylene glycol monomethyl ether acetate and n-butyl acetate) | 20.6 | 25.5 | 17.4 | 21.5 |
| 2. Titanium dioxide | 7.9 | 24.3 | 11.6 | 10.7 |
| 3. Titanium dioxide vesiculated beads | 0.4 | 0.0 | 0.4 | 1.1 |
| 4. Zinc barium phosphate | 19.1 | 4.8 | 18.0 | 17.9 |
| 5. Zinc salt of a substituted benzoic acid (Sicorin RZ) | 1.9 | 0.5 | 1.8 | 1.8 |
| 6. Aluminum triphosphate (K-White 84 or K-White 105) | 15.1 | 7.4 | 18.3 | 11.0 |
| 7. Surface active agent | 0.2 | 0.2 | 0.2 | 0.2 |
| 8. Organic solvents | 24.9 | 25.1 | 23.9 | 25.5 |
| 9. 100% solids polyisocyanate resin | 9.9 | 12.2 | 8.4 | 10.3 |

More specifically, in examples 3-6, the polyester polyol blend was used as a solution, e.g., 79% solids in propylene glycol monomethyl ether acetate and butyl acetate. The polyisocyanate is a 100% solids, e.g., substantially contains no solvents. The coatings are prepared by mixing all of the ingredients, except the polyisocyanate resin and then milling the mixture to a fineness of about 5 for camouflage and 7 for high gloss colors on the Hegman scale according to ASTM D1210. Subsequently, the polyisocyanate resin is added before the application of the coating to the substrate. The coating is applied on the substrate at dry-film thickness ranging from about 0.001 to 0.004 inches e.g. about 0.0020 to 0.0024 inches or up to about 10 mils and preferably 1 to 4 mils. The coating may be applied by various methods including spraying, rolling, or brushing onto the surface depending on the viscosity. The viscosity of the coating for the particular application may be achieved by adjusting the content of the solvent within the ranges specified herein and by the selection of the particular reactants used to form the urethane resin. After the coating is applied to the surface, the solvent is evaporated at room or elevated temperatures and the coating is allowed to cure to a film thickness having the desired properties. The pigments can be introduced into the coating by first forming a mill base with the polyester polyol. The mill base can be formed, for example, by conventional sand-grinding or ball-milling techniques, and then blended, by simple stirring or agitation with the other ingredients of the composition.

It was unexpected to find that the specific combination of the aluminum triphosphate zinc salt of benzoic acid, e.g. zinc benzoate and an alkaline earth metal phosphate, e.g., zinc or zinc-barium phosphates, improved the corrosion resistance while maintaining all the other desirable characteristics required of the coating. In other words, the specific combination of the zinc salts of substituted benzoic acid, aluminum triphosphate, and zinc or zinc-barium phosphates, in the ratios stated, improved the corrosion inhibition substantially when compared to the use of either one of these three metal salts alone in the same coating.

More specifically, the preferred polyester polyols of this invention have equivalent weights ranging from about 260 to 970 with hydroxyl numbers ranging from 40 to 252 and an acid number less than 10. The polyols includes a variety of polyester polyhydroxyl compounds known in the art including, for example, the condensation-reaction products of pentaerythritol and/or glycols with monocarboxylic acids or an aromatic or aliphatic dicarboxylic acid. Any branched-chain glycol maybe used in the formation of the polyester, although it is preferred that these glycols contain no more than 8 carbon atoms. A useful polyol is formed where the molar ratio of glycol to pentaerythritol is from 2:1 to about 6:1. The carboxylic acid component of the polyester polyol prevents the molecular weight build-up of the polyol. It has been found that any aromatic or aliphatic monocarboxylic acid or mixtures of these having 18 or less carbon atoms can be used. Normally, the acids are used in a molar ratio of acid to polyalcohol of about 1:1 to 2.5:1.

Examples of aromatic monocarboxylic acids include benzoic acid, butylbenzoic acid, triethyl benzoic acid, toluic acid, phenylacetic acid, and the like. Examples of aliphatic acids are acetic acid, propionic acid, butyric acid, valeric acid, caproic acid, caprylic acid, pelargonic acid, capric acid, lauric acid, myristic acid, palmitic acid, stearic acid, etc.

The dicarboxylic acids useful in the formation of the polyester polyols have the general formula:

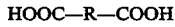

HOOC—R—COOH where R is aliphatic or aromatic group. Preferred are succinic acid, glutaric acid, adipic acid and pimelic acid. Useful acids are those in which R has 2 to 8 carbon atoms with the preferred being maleic acid and itaconic acid. The aromatic dibasic acids are phthalic, isophthalic, and terephthalic, although other aromatic dibasic acids can be used.

It is known that the lower alkyl mono- or diesters of these acids and the anhydrides thereof can be used in place of the free acids. Other known polyester polyols can be obtained by the condensation reaction between a polybasic acid, such as adipic acid, phthalic anhydride, isophthalic acid, etc., and a diol or triol, such as ethylene glycol, diethylene glycol, propylene glycol, trimethylol propane, glycerine, etc.

The hydroxyl numbers of the preferred polyester polyols should be at least 40 and preferably between 40 and 252. The polyesters, containing hydroxyl groups, are combined with the polyisocyanate. This combination can be carried out in several ways known to the art. For example, an organic solution of the polyester containing, if desired, a catalyst-promoting urethane formation such as an organo-tin compound, is added to an chemical equivalent amount of the isocyanate. The combination is made at ambient temperature but the heat of reaction usually causes an increase in temperature. The mixture is agitated preferably at room temperature until the urethane reaction is substantially completed. The course of the reaction can be followed by noting the viscosity of the mixture. When the viscosity becomes substantially constant, it may be concluded that the reaction is substantially completed. The resultant reaction product may contain insignificant amounts of free isocyanate and/or hydroxyl groups.

Alternatively, the polyester solution can be reacted with a small excess, e.g. about 10% excess of the isocyanate. After the urethane reaction is substantially completed, the excess NCO groups can be reacted with "chain-extending" substances, e.g. water, alcohols, etc. This procedure results in polymers of substantially equivalent character but permits the reaction to proceed at a faster rate, due to the mass action of the excess NCO groups. The term "small excess" is intended to be included within the meaning of the term "stoichiometric amounts".

The polyisocyanates and particularly the aliphatic polyisocyanates based on HDI include various multifunctional aliphatic polyisocyanates having an isocyanate content (NCO) ranging from about 10 to 30% by weight with an equivalent weight (NCO) ranging up to about 300. Specific examples of the organic polyisocyanates used in this invention make up about 5 to 30% and preferably 5 to 20% by weight of the film-forming blend. These compounds include aliphatic, cycloaliphatic, alkaryl, aralkyl, heterocyclic, and aryl di- or triisocyanates. Specific compounds include, for example, polyisocyanates such as:

diphenylmethane-4,4'-diisocyanate,
diphenylene-4,4'-diisocyanate
toluene-2,4-diisocyanate,
toluene-2,6-diisocyanate,
3,3'-dimethoxy-4,4' -diphenylene diisocyanate methylene-bis-(4-cyclohexyl isocyanate)
tetramethylene diisocyanate,
hexamethylene diisocyanate,
decamethylene diisocyanate,
ethylene diisocyanate,
ethylidene diisocyanate,
propylene-1,2-diisocyanate,
cyclohexylene-1,2-diisocyanate,
m-phenylene diisocyanate,
p-phenylene diisocyanate, 1,5-naphthalene diisocyanate,
3,3'-dimethyl-4,4'-biphenylene diisocyanate,
3,3'-dimethoxy-4-4'-biphenylene diisocyanate,
3,3'-diphenyl-4,4'-biphenylene diisocyanate,
4,4'-biphenylene diisocyanate,
3,3'-dichloro-4,4'-biphenylene diisocyanate,
furfurylidene diisocyanate,
bis-(2-isocyanatoethyl)fumarate,
1,3,5-benzene triisocyanate,
para, para', para"-triphenylmethane triisocyanate,
3,3'-diisocyanatodipropyl ether,
xylylene diisocyanate,
B,B-diphenyl propane-4,4'-diisocyanate, and isophorone diisocyanate. Preferred polyisocyanates include hexamethylene diisocyanate and methylene-bis-(4-cyclohexyl isocyanate) e.g. DESMODUR-N.

By selecting the proper polyols and by adjusting the NCO to OH ratio, the physical properties and efficiency of the film, such as the strength of film, flexibility, chemical resistance, solvent resistance, etc., can be controlled over a wide range. Compounds where the NCO to OH ratio ranges from 0.85 to 1.6 of NCO to 1.0 of OH groups e.g. 1.2:1 are useful for the manufacture of coating in accordance with this invention.

If the coating is derived from a two-package system, the polyisocyanate is in one package and a solution of the polyol is in a separate package. The two reactants, one containing the pigments, are thoroughly mixed just before applying the coating onto the surface. Separation of the two reactants is usually necessary since the "pot life" of some of the compositions is short. The polyisocyanate (NCO) reacts with the hydroxyl groups of the polyol at temperature as low as about 40° F. (4° C.). Regardless of the method by which the coating composition is prepared, the coating should contain 15 to 50 parts by weight of the polyurethane resin and up to about 50 parts, e.g. 0–50 parts by weight of solvent. The solvent of the composition can be a mixture of organic solvents wherein the constituents of the urethane react.

Instead of the two-component or "two-package" system, a "one package" coating can be used if the reactive groups of the polyisocyanate are blocked with a blocking agent such a methylethyl ketoxime. This eliminates the need for keeping the polyol apart from the polyisocyanate until just before use. When the coating, with the blocked polyisocyanate, is applied and heated the blocking agent is released, permitting the polyisocyanate to react with the polyester polyol.

The blocking agents are used for purposes of masking the free isocyanate radical of the polyisocyanates. These agents include phenol, m-nitrophenol, p-chlorophenol, ethyl malonate, acetylacetone, ethyl acetoacetate, cresol, methanol, ethanol, ethylene, chlorophydrin, etc. Although the temperatures at which the above-mentioned blocking agents are dissociated varies with the agents, it is generally accepted that heating is required to deblock.

The coating composition also can contain ultraviolet light stabilizers, antioxidants, catalysts, wetting or dispersing agents, e.g., Anti-Terra-204 (carboxylic acid salts of polyamine-amides), flow modifiers e.g. BYK-320 (polyether modified methylalkyl polysiloxane copolymers), adhesion promoters, etc. The ultraviolet light stabilizer can be present in an amount of 1–10% by weight, based on the weight of the urethane binder. The antioxidants can be present also in amounts of 0.1–3% by weight of the urethane binder. Ultraviolet light stabilizers include benzophenones, triazoles, triazines, benzoates, substituted benzenes, organophosphorous sulfides, etc.

The coating composition of this invention may contain about 0.01–2.0% by weight, based on the weight of the polymer forming blend, of a curing catalyst. The catalysts are usually organo metallics such as dibutyl tin dilaurate and zinc octoate, dibutyl tin di-2-ethylhexoate, stannous octoate, stannous oleate, zinc naphthenate, vanadium acetyl acetonate, and zirconium acetyl acetonate. Also useful as catalysts are tertiary amines, such as, for example, triethylene diamine, triethylamine, pyridine, dimethylaniline, and methyl morpholine. When a two-component system is used, the catalyst can be added to either the polyisocyanate or the solution of the polyester polyol.

The coating composition of this invention can be applied to a variety of substrates by conventional application methods such a spraying, dipping, brushing, or flow coating. Substrates that can be coated with the composition are, for example, metal, wood, glass, or plastics such as polypropylene, polystyrene, and the like. The coating is particularly suited for application over pretreated or unprimed metal. The coating can be cured at ambient temperatures or heated at 40°–120° C. for up to an hour or more. If the coating contains a blocked polyisocyanate, temperatures ranging up to about 160° C. may be necessary.

The solvent known for use with paints may include a mixture of solvents, e.g., benzene, toluene, xylene, and naphtha. Ester solvents include the acetates, e.g., ethyl acetate, butyl acetate, hexyl acetate, amyl acetate, etc., propionates such as ethyl propionate, butyl propionate, etc. Ketone solvents include acetone, methyl-ethyl ketone, methyl-isopropyl ketone, methyl-isobutyl ketone, diethyl ketone, cyclohexanone, etc. Glycol ester solvents include ethylene glycol, monoethyl-ether acetate, etc.

The particular alkaline earth metal or zinc phosphates used in preparing the coating composition is preferably a zinc-barium phosphate. The preferred zinc salt of benzoic acid is specifically characterized as having at least one hydroxyl group and nitro ($NO_2$) substituent and molecular weights of about 100–500, e.g. 300, density of about 2–3 grams per mililiter and a specific surface area of $16M^2$/gram. The benzoic acid salts are commercial products obtained from BASF and identified as Sicorin-RZ. The aluminum triphosphate may be characterized as follows and more specifically in Table I.

ALUMINUM TRIPHOSPHATE

[Structure of K-WHITE]
$AlH_2P_3O_{10}2H_2O$

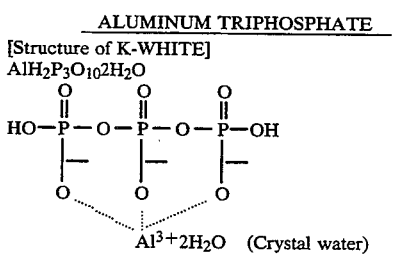

TABLE I

| Substance | Components | TSCA No. |
|---|---|---|
| K-WHITE NO. 82 | $AlH_2P_3O_{10}.2H_2O$ | 13939 - 25 - 8 |
| No. 84 | $SiO_2$ | 7631 - 86 - 9 |
| | ZnO | 1314 - 13 - 2 |
| K-WHITE NO. 105 | $AlH_2P_3O_{10}.2H_2O$ | 13939 - 25 - 8 |
| | ZnO | 1314 - 13 - 2 |
| K-BOND NO. 80 | $AlH_2P_3O_{10}.2H_2O$ | 13939 - 25 - 8 |
| | $SiO_2$ | 7631 - 86 - 9 |
| K-FRESH NO. 100 | $AlH_2P_3O_{10}.2H_2O$ | 13939 - 25 - 8 |
| K-BOND NO. 90 | $Al(PO_3)_3$ | 13776 - 88 - 0 |
| | $SiO_2$ | 7631 - 86 - 9 |

In testing the coatings prepared in accordance with this invention, the corrosion protection for an aluminum substrate was found to be over 2000 hours in 5% salt spray in accordance with ASTM Test Method B-117 and over 500 hours in $SO_2$/salt spray in accordance with ASTM Test Method G-85. The coating was found to have outstanding performance when exposed to extreme heat conditions, high intensity of light and water, extreme cold conditions, hot lubricating oils and other chemicals normally found in aircraft operations. By utilizing the coating composition of this invention, a corrosion resistant film can be obtained on various substrates. The coating therefore has properties which function as a primer and more important as a single topcoat which is highly adherent, flexible, chemical resistant and resistant to all weather conditions. The coatings of this invention lower the risk of failure due to cracking especially at low temperatures and are easily touched-up since only one coating need be applied. Since the coating requires only one coat, it requires less time for application and removal and thereby saves on manpower that would generally be needed in the preparation of a two coat system. Moreover, the present coating provides protection at lower film thicknesses thereby reducing the weight of the coating compared to a two-coat paint system which is an important factor when considering aircraft coatings.

It is obvious that there are other variations and modifications which can be made with respect to this invention without departing from the spirit and scope of the invention as particularly set forth in the appendant claims.

The invention claimed is:

1. A corrosion-resistant self-priming coating comprising from about 15 to 50 parts by weight of a polyurethane binder, 1 to 30 parts by weight of an alkaline earth metal phosphate, 0.1 to 5.0 parts by weight of a zinc benzoate, 1 to 25 parts weight of an aluminum triphosphate, 1–30 parts by weight of titanium dioxide, 0 to 2.0 parts by weight of an oil soluble surface active agent and 0 to 50 parts by weight of at least one organic solvent.

2. The coating of claim 1 wherein the polyurethane ranges from about 20 to 40 parts by weight, titanium dioxide ranges from about 5 to 25 parts by weight, alkaline earth metal phosphate ranges from about 5 to 25 parts by weight, zinc benzoate ranges from about 0.5 to 2.0 parts by weight, aluminum triphosphate ranges for about 5 to 20 parts by weight, the surface active agent ranges from 0.1 to 0.5 parts by weight and the solvent ranges from about 15 to 30 parts by weight.

3. The coating of claim 2 wherein up to about 100 percent by weight of the total amount of titanium dioxide is in the form of vesiculated beads.

4. The coating of claim 2 wherein 0 to 10 percent by weight of the total amount of titanium dioxide is in the form of vesiculated beads.

5. The coating of claim 3 wherein the zinc benzoate is a salt of a substituted benzoic acid having one hydroxyl group and one nitro group.

6. The coating of claim 5 wherein the polyurethane is derived from an isocyanate and a polyester polyol wherein the NCO to OH group ratios range from 0.85–1.6 to 1.0.

7. The coating of claim 6 wherein the polyurethane is derived from an aliphatic polyisocyante and an aliphatic polyester polyol.

8. The coating of the claim 7 wherein the NCO to OH ratio of the isocyanate and the aliphatic polyester polyol is about 1.2 to 1.0.

9. The coating of claim 8 wherein the zinc salt of the benzoic acid has one hydroxyl and one nitro ($NO_2$) group.

10. The coating of claim 7 wherein the aliphatic polyester polyol and the aliphatic polyisocyanate are reacted at a NCO to OH ratio of about 1.2 to 1.0.

11. The coating of claim 2 wherein the alkaline earth metal phosphate is a zinc-barium phosphate.

12. The coating of claim 2 wherein the alkaline earth metal phosphate is zinc phosphate.

* * * * *